July 7, 1936.　　　　H. T. HARRIS　　　　2,046,683
JAR OPENER AND SEALER
Filed Dec. 7, 1935
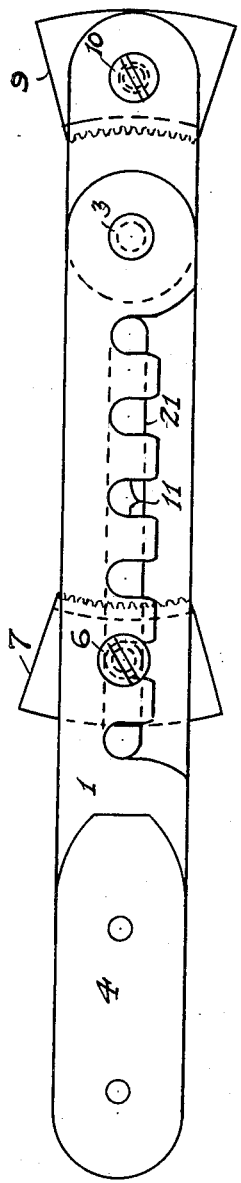
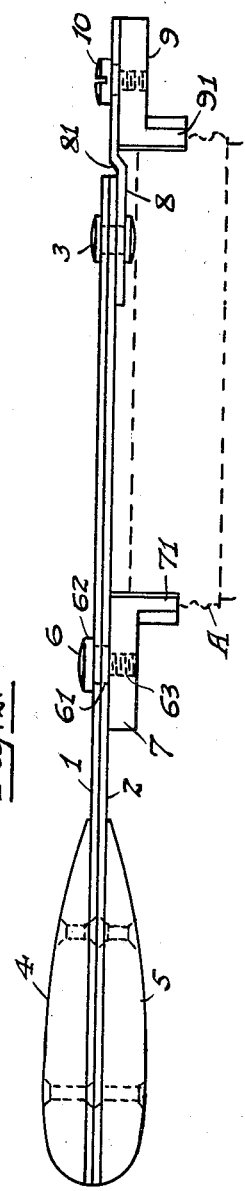
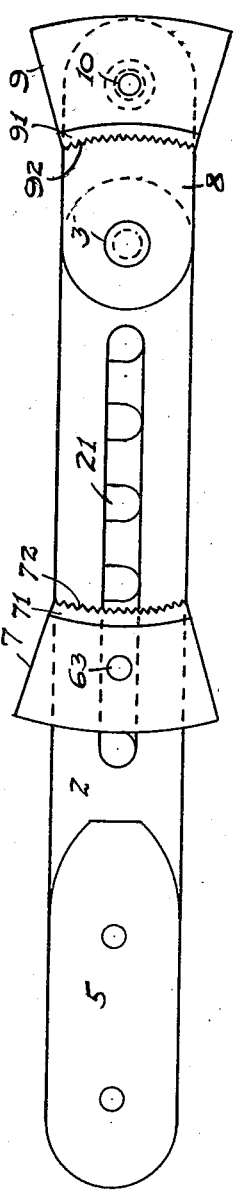
INVENTOR:-
Harry T Harris Patented July 7, 1936

2,046,683

UNITED STATES PATENT OFFICE 2,046,683

JAR OPENER AND SEALER

Harry T. Harris, Detroit, Mich.

Application December 7, 1935, Serial No. 53,292

1 Claim. (Cl. 81—3.1)

My invention relates to jar openers and sealers, and its principal object is to provide a device of the character referred to which may be easily and quickly adjusted to operate on jar covers or lids of various sizes.

Another object of my said invention is to provide means by which the device, after being adjusted to the particular size of lid to be operated upon, will automatically grip or release the cover without the use of screw clamps or other complicated devices.

A further object of my said invention is to provide a jar opener and sealer which is simple in construction and which is adapted for manufacture in large quantities by modern methods of production.

With these and other objects in view, I will now describe a preferred embodiment of my invention with reference to the accompanying drawing, in which—

Figure 1 is a plan view.

Figure 2 is a side elevation, and

Figure 3 is an underside view.

Like characters designate corresponding parts throughout the several views.

In the drawing, 1, 2 designate a pair of flat lever members, of steel or any suitable material, pivotally connected at one end by the rivet 3 and provided at their other ends with half handles 4, 5, of wood, "bakelite" or other suitable material, which, when positioned in alignment one with the other, afford a convenient means for manual operation of the device. These half handles may be secured to the flat lever members by any suitable means such as the countersunk rivets shown, but obviously they may in some cases be pressed up in hollow form from the material of the levers themselves.

The upper lever 1 is provided with a series of notches 11 arranged in equally spaced relation and of a width suitable for engagement with the barrel portion 61 of a stud 6, and in the lower lever 2 is a longitudinal slot 21 in which the said barrel portion slidably engages. The stud 6 is provided with a head 62 and with a threaded portion 63 which is tightly screwed into a jaw 7. The said jaw in plan view is formed as a segment of a circle having a flat surface adapted to fit against the underside of the lever 2 and having also a depending flange 71.

Pivotally connected to the hinged levers 1 and 2 by means of the rivet 3 is a flat link 8 positioned upon the underside of the lower member 2 and carrying at its outer end a jaw 9 which is secured to it by the screw 10, as shown more clearly in Figure 2, the said jaw having a flat upper surface adapted to fit against the underside of the link 8 and provided with a depending flange 91.

The jaws 7 and 9 are substantially alike in construction and are formed upon their opposed inner faces with a series of teeth or serrations 72, 92, respectively, which are of fine pitch so as to ensure a proper gripping of the jar covers without damaging the same. In order to bring the jaws 7 and 9 into horizontal alignment one with the other, the link 8 is offset at 81 as will be understood.

In operation, the device is first adjusted approximately to the diameter of the lid A to be manipulated, which is effected by separating the levers 1 and 2 in a radial direction so that they swing about the rivet 3, until the notches 11 are clear of the stud 6, the stud being then moved along the slot 23 carrying with it the jaw 7, and when it arrives opposite the proper notch, the members 1, 2 are then brought into alignment, locking the stud 6 and the jaw 7 in position. The device is then positioned upon the jar so that the underside of the member 2 rests on the upper surface of the lid. At this time, if the device has been properly adjusted, the jaws will rest somewhat loosely against the outer periphery of the lid, but by a rotary movement of the device around the axis of the jar, the toggle action due to co-operation of the members 1, 2 and the link 8, will cause the jaws to be tightened upon the lid so that they may in this way be moved forcibly in a loosening or tightening direction as desired.

It will be observed from the foregoing description and by reference to the drawing that I have provided a device which is simple in construction and well adapted for the purpose intended. Furthermore, it will be noted that, due to the toggle action produced by co-operation between the members 1 and 2 and the link 8, a very powerful grip is obtained upon the cover without the exercise of any great force on the part of the operator, such as is necessary with devices of the tongs or pinchers type at present in use.

While I have herein described and illustrated a preferred embodiment of my invention, it will be understood by those skilled in the art to which the same relates that I may modify the construction in various ways to suit any particular or peculiar requirement without departing from the spirit of my invention as defined in the appended claim. For example, in some cases, instead of the serrations 72, 92 upon the inner faces of the jaws, I may cover the same with pads of rubber or other resilient material adapted to frictionally engage the peripheral surfaces of the covers.

Having thus described my said invention, what I claim and desire to secure by Letters Patent of the United States is:

A device of the character described comprising; a pair of levers hinged together at one end and having manual gripping means at their free ends, one of said levers having a longitudinal slot therein while the other is provided with a series of lateral notches; a stud slidably mounted in said slot and adapted to engage one of said notches; a gripping member secured to said stud; a link pivoted to said levers at their point of connection; and a second gripping member pivoted to the free end of said link and adapted to co-act with said first-mentioned gripping member so as to engage an article to be turned.

HARRY T. HARRIS.